(12) United States Patent
Matsumoto

(10) Patent No.: US 9,297,393 B2
(45) Date of Patent: Mar. 29, 2016

(54) ACTUATOR

(75) Inventor: Tetsuro Matsumoto, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 919 days.

(21) Appl. No.: 13/029,559

(22) Filed: Feb. 17, 2011

(65) Prior Publication Data

US 2011/0203265 A1    Aug. 25, 2011

(30) Foreign Application Priority Data

Feb. 19, 2010   (JP) ................. 2010-035168

(51) Int. Cl.
| | | |
|---|---|---|
| F01B 3/00 | (2006.01) | |
| F15B 15/18 | (2006.01) | |
| B60T 13/74 | (2006.01) | |
| F15B 15/10 | (2006.01) | |

(52) U.S. Cl.
CPC ............... *F15B 15/18* (2013.01); *B60T 13/745* (2013.01); *F15B 15/103* (2013.01)

(58) Field of Classification Search
CPC .......................... F15B 15/065; B60T 13/745
USPC ......... 92/31, 136; 60/545, 582, 592; 417/543, 417/429
See application file for complete search history.

(56) References Cited

U.S. PATENT DOCUMENTS

| | | | |
|---|---|---|---|
| 479,412 A | 7/1892 | Foster | |
| 3,461,914 A | 8/1969 | Sugimura et al. | |
| 3,765,804 A * | 10/1973 | Brandon | 417/540 |
| 3,849,986 A | 11/1974 | Vural | |
| 3,872,670 A | 3/1975 | Dezelan et al. | |
| 4,003,203 A | 1/1977 | Vural | |
| 5,007,812 A * | 4/1991 | Hartt | 417/534 |
| 5,051,074 A * | 9/1991 | Cowan | 417/535 |
| 5,345,766 A * | 9/1994 | Leonhartsberger et al. | 60/545 |
| 6,062,830 A * | 5/2000 | Kikuchi et al. | 417/540 |
| 6,209,443 B1 * | 4/2001 | Perez | 92/39 |
| 6,575,264 B2 * | 6/2003 | Spadafora | 180/422 |
| 7,600,376 B2 * | 10/2009 | Hall et al. | 60/413 |
| 7,954,318 B2 * | 6/2011 | Pritchard | 60/545 |
| 2002/0083828 A1 * | 7/2002 | Bernier | 92/92 |
| 2002/0157388 A1 * | 10/2002 | Seto et al. | 60/325 |
| 2011/0203265 A1 | 8/2011 | Matsumoto | |

FOREIGN PATENT DOCUMENTS

| | | |
|---|---|---|
| JP | Y-42-004283 | 3/1967 |
| JP | B-43-001001 | 1/1968 |
| JP | S44-28610 A | 11/1969 |
| JP | U-47-029193 | 4/1971 |
| JP | S46-030810 Y | 10/1971 |
| JP | B-47-00347 | 1/1972 |

(Continued)

*Primary Examiner* — Edward Look
*Assistant Examiner* — Daniel Collins
(74) *Attorney, Agent, or Firm* — Oliff PLC

(57) ABSTRACT

An actuator is equipped with a moveable part 160 that moves according to changes in an intake amount of air, a cylinder 140 that contains air and pumps the air through a fluid pipe 150 to the moveable part 160 according to pressure applied to the air, and a piston 130 that applies pressure to the air in the cylinder 140. Further, the actuator is equipped with a motor 100 that generates rotational force, and a screw 110 and a slide nut 120 that convert the rotational force to a force to move the piston 130. The air is enclosed in the moveable part 160, the cylinder 140 and the fluid pipe 150.

7 Claims, 6 Drawing Sheets

(56) References Cited

FOREIGN PATENT DOCUMENTS

| | | |
|---|---|---|
| JP | A-47-003916 | 2/1972 |
| JP | A-48-024175 | 3/1973 |
| JP | A-49-077071 | 7/1974 |
| JP | S50-13785 A | 2/1975 |
| JP | B-52-009847 | 3/1977 |
| JP | S57-47047 A | 3/1982 |
| JP | A-58-180802 | 10/1983 |
| JP | A-61-098491 | 5/1986 |
| JP | A-62-184207 | 8/1987 |
| JP | A-64-062154 | 3/1989 |
| JP | A-03-223502 | 10/1991 |
| JP | U-03-098304 | 10/1991 |
| JP | A-11-182415 | 7/1999 |
| JP | A-11-270503 | 10/1999 |
| JP | A-2001-248601 | 9/2001 |
| JP | A-2003-161303 | 6/2003 |
| JP | 2005-524802 A | 8/2005 |
| JP | A-2005-230949 | 9/2005 |
| JP | 2011-169425 A | 9/2011 |
| WO | 03/093647 A1 | 11/2003 |
| WO | WO 2006/080088 A1 | 8/2006 |

\* cited by examiner

ACTUATOR

The entire disclosure of Japanese Patent Application No. 2010-035168, filed Feb. 19, 2010 is expressly incorporated by reference herein.

BACKGROUND

1. Technical Field

The present invention relates to actuators and, in particular, to actuators that are driven by flow movement of fluid.

2. Related Art

Pneumatic actuators that are driven by moving air caused by a pressure applied to the air are available as power sources for robots or the like. A typical pneumatic actuator has a syringe-like structure composed of a cylinder and a piston, and may be equipped with a tank and a compressor for pumping compressed air to the cylinder. As the compressed air is pumped out from the compressor to the cylinder through the tank, the piston that is a moveable part operates. An actuator having such a structure is described in, for example, JP-A-2005-230949 (Patent Document 1).

However, the actuator having the structure described above needs a tank and a compressor, which would result in a large-scale structure. In this respect, JP-A-2001-248601 (Patent Document 2) describes an actuator that uses shape memory alloy, wherein a piston connected to the shape memory alloy is slidably moved by heating and contracting the shape memory alloy.

The actuator described in Patent Document 2 can be structured in a smaller size, compared to the structure described in Patent Document 1, but needs to use parts composed of relatively expensive material such as shape memory alloy. Further, as the actuator needs to be heated, there is an issue concerning energy efficiency. Moreover, when the piston that is a moveable part is moved by using shape memory alloy, its movements become relatively rigid, compared to other related technologies that drive a moveable part by flowing movement of fluid.

SUMMARY

In accordance with some aspects of the invention, an actuator that can solve at least one of the problems described above can be provided.

In accordance with an embodiment of the invention, an actuator is equipped with a first moveable part that moves according to changes in an intake amount of first fluid, a first cylinder containing the first fluid and configured to be able to supply the first fluid to the first moveable part, a piston configured to apply pressure to the first fluid in the first cylinder, a motor that generates rotational force, and a power converter that converts the rotational force to a force for moving the piston.

By the actuator having the structure described above, a small-sized actuator can be provided without the necessity of large-sized components such as a compressor and a tank. Also, it is possible to provide an actuator that does not require heating for operation of the actuator and is thus excellent in energy efficiency. Furthermore, the moveable part is moved by flowing fluid such as air, such that an actuator capable of relatively soft and smooth operations can be provided.

In accordance with an aspect of the embodiment, the actuator may further be equipped with a safety device configured to be able to take in a portion of the first fluid when a pressure is applied to the first fluid by a force applied to the first moveable part.

According to the actuator having the structure described above, when force is applied to the first moveable part due to some external factor, causing a pressure to be applied to the first fluid, the safety device absorbs the pressure, such that the actuator including the first moveable part can be prevented from being destroyed.

The safety device may be provided between the first moveable part and the first cylinder, and may be configured to be expandable.

In one aspect, the actuator may further be equipped with a pressure sensor that measures pressure applied to the first fluid, and a motor control section that controls the rotational force generated by the motor based on the pressure measured by the pressure sensor.

With such a structure, the pressure to be applied to the first fluid can be controlled, such that an actuator that is more precisely operable can be provided.

Moreover, the actuator in accordance with an aspect of the embodiment may further be equipped with a second moveable part that operates according to changes in an intake amount of second fluid, and a second cylinder containing the second fluid, and configured to be able to supply the second fluid to the second moveable part. Further, the piston may be configured to apply pressure also to the second fluid in the second cylinder.

According to the actuator having such a structure, it is possible to provide an actuator that can move multiple moveable parts at the same time. Further, according to another aspect, an actuator may be configured such that multiple moveable parts can be moved at the same time in a manner to have a relation in which one of the moveable parts contracts while the other extends. The use of such an actuator is effective when movements similar to those of muscles of the human arm are to be achieved. More specifically, the muscles of the human arm move in a manner that, when one group of muscles on one side thereof extend, the other group of muscles on the other side contract. Therefore, the actuator described above is capable of movements similar to movements of the muscles of the human arm.

DESCRIPTION OF EXEMPLARY EMBODIMENTS

Figure 1:
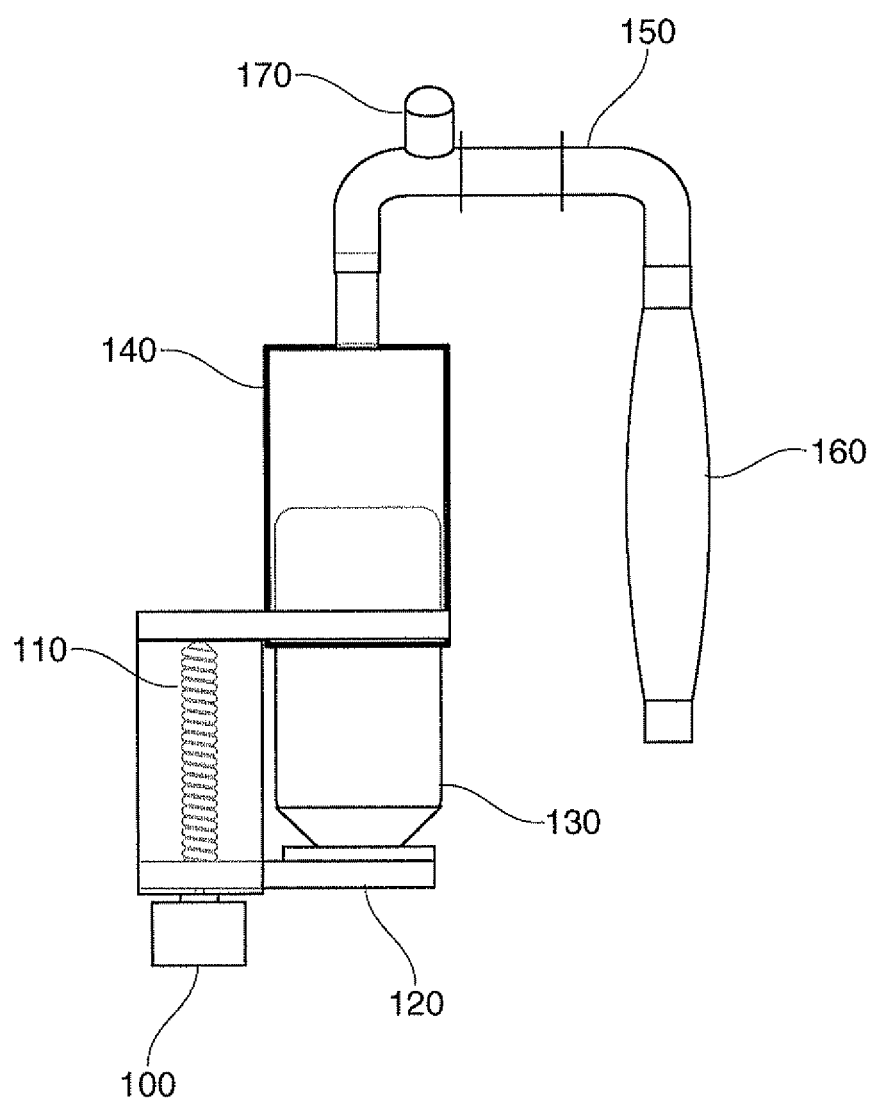
FIG. 1 is a diagram of the structure of an actuator in accordance with an embodiment of the invention.

Preferred embodiments of the invention are specifically described below with reference to the accompanying drawings, according to the following composition. It is noted that embodiments to be described below are merely examples of the invention, and would not limit the technical scope of the invention. In the descriptions of the drawings, identical components are appended with identical reference numerals, and their description may not be duplicated.

1. Embodiment 1
(1) Structure of Actuator
(2) Operation of Actuator
(3) Structure Including Pressure Sensor and Motor Control Section
(4) Characteristics of Embodiment 1

2. Embodiment 2
(1) Structure of Actuator Equipped with Plural Moveable Parts
(2) Operation of Actuator Equipped with Plural Moveable Parts
(3) Characteristics of Embodiment 2

3. Applicability of the Invention

1. Embodiment 1

(1) Structure of Actuator

FIG. 1 is a diagram showing the structure of an actuator in accordance with Embodiment 1. As shown in FIG. 1, the actuator of Embodiment 1 is configured with a motor 100, a screw 110, a slide nut 120, a piston 130, a cylinder 140, a fluid pipe 150, a moveable part 160, and a safety device 170.

The motor 100 is configured to generate rotational force by externally provided control. The rotational force generated by the motor 100 is transmitted to the screw 110. It is noted that a speed reducer device may be provided between the motor 100 and the screw 110 for adjusting the rotational force generated by the motor 100 and transferring the same to the screw 110.

The screw 110 is configured to convert the rotational force given from the motor 100 to force that moves the slide nut 120 and the piston 130 in a linear direction. In other words, the screw 11 is a type of a force converter that converts rotational force of the motor 100 to force in a linear direction.

The slide nut 120 and the piston 130 are configured to move in the linear direction by the force transferred from the screw 110. More specifically, as the screw 110 rotates, the slide nut 120 slides, and the piston 130 connected to the slide nut 120 moves. By this operation, the piston 130 can move back and forth within the cylinder 140. The piston 130 applies pressure to air inside the cylinder 140 with the back and forth movements. It is noted that the back and forth movements refer to movements of the piston 130 in the up-down direction in FIG. 1, which take place when the piston 130 slides in the cylinder 140. Although Embodiment 1 is configured to be equipped with the slide nut 120, the slide nut 120 may not necessarily be required, and the screw 110 and the piston 130 may be configured in a manner to be directly connected to each other.

The cylinder 140 includes a fluid, such as, for example, air. As the pressure is applied by the piston 130, the air enclosed in the cylinder 140 is compressed. The cylinder 140 is configured to be able to supply the compressed air to the moveable part 160 through the fluid pipe 150.

The fluid pipe 150 is configured to connect the cylinder 140, the moveable part 160 and the safety device 170 so as to be able to transfer the air there through.

The moveable part 160 is configured to be able to take in air. The moveable part 160 has a side surface that is expandable upon application of a predetermined pressure or higher, and is configured to be able to store more air as it expands. Also, the moveable part 160 has the expandable side surface but is provided with an upper surface and a bottom surface that are configured not to expand. The upper surface of the moveable part 160 is connected and affixed to the fluid pipe 150, but the bottom surface is formed to be displaceable. Accordingly, the moveable part 160 expands according to the amount of air taken in, and this expansion causes the bottom surface of the moveable part 160 to displace, thereby generating linear movements.

The safety device 170 is provided in a manner connected to the fluid pipe 150, and is configured to absorb pressure from the moveable part 160 when the pressure is applied to the air by force caused by some external factor. More specifically, the safety device 170 is configured to expand when pressure at a predetermined level or higher is applied to the fluid pipe 150, allowing the fluid in the fluid pipe 150 to be temporarily taken (withdrawn) into the safety device 170.

(2) Operation of Actuator

Next, an operation of the actuator in accordance with Embodiment 1 will be described with reference to FIG. 2 and FIG. 3.

Figure 2:
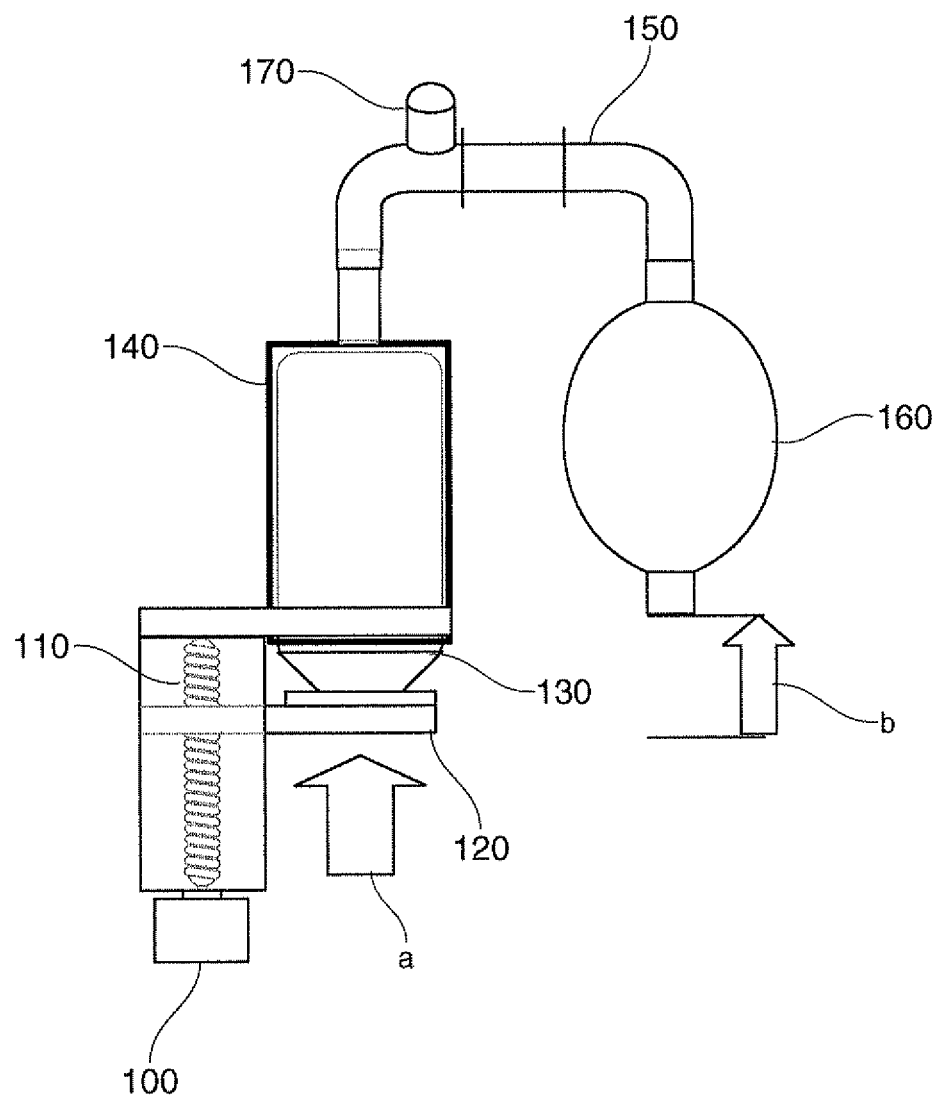
FIG. 2 is a diagram showing the actuator in a state in which its moveable part is operated.

FIG. 2 is a diagram showing a state in which the moveable part 160 expands. The motor 100 generates predetermined rotational force to rotate the screw 110 for operating the moveable part 160. The screw 110 rotates by the rotational force applied by the motor 100, and converts the rotation to force in a linear direction which is conveyed to the slide nut 120. The slide nut 120 is displaced by an amount indicated by a in FIG. 2. As the slide nut 120 moves, the piston 130 also moves in a similar manner. As the piston 130 moves in the upward direction in FIG. 2, the air inside the cylinder 140 is compressed. The air compressed in the cylinder 140 is pumped out to the moveable part 160 through the fluid pipe 150. The moveable part 160 does not expand until the air inside reaches a predetermined pressure level, and starts expansion when it exceeds the predetermined pressure. Then, the air at the predetermined pressure or higher flows in the expanded moveable part 160. As a result, the bottom surface of the moveable part 160 is displaced by an amount indicated by b.

Figure 3:
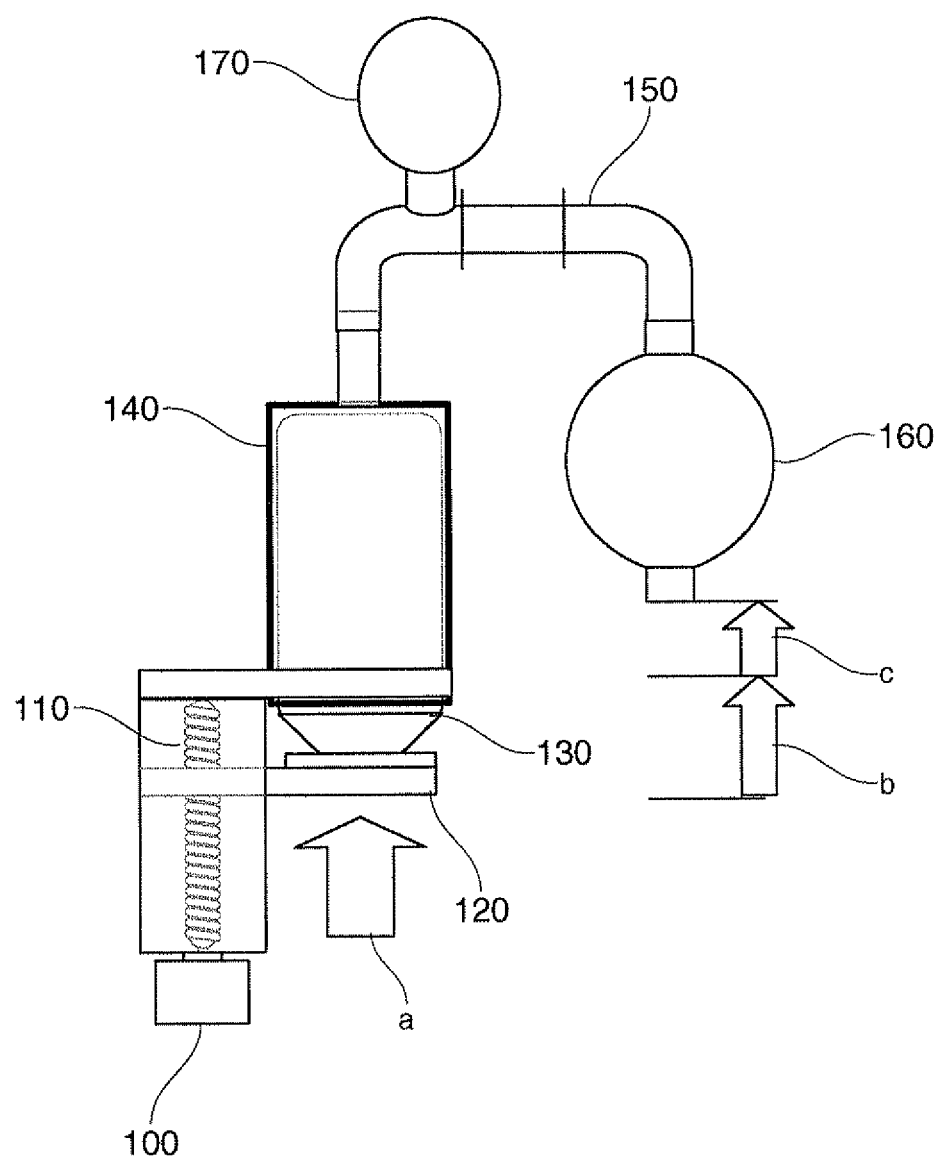
FIG. 3 is a diagram showing the actuator in a state in which its safety device is operated.

FIG. 3 is a diagram showing a state in which the moveable part 160 and the safety device 170 expand. In the state in which the moveable part 160 expands as shown in FIG. 2, there may be occasions when force is applied to the bottom surface of the moveable part 160 due to some external factor. In this instance, let us assume that the bottom surface of the moveable part 160 is displaced by an amount c, as shown in FIG. 3. The displacement generates pressure to be applied to the air enclosed in the moveable part 160. When the pressure applied to the air due to external factors reaches a predetermined level, the safety device 170 expands, and therefore can take in a portion of the fluid enclosed in the fluid pipe 150. As a result, the air pressure can be prevented from elevating higher than a predetermined level, and the air pressure within the actuator can be controlled within a specified range.

(3) Structure Including Pressure Sensor and Motor Control Section

Figure 4:
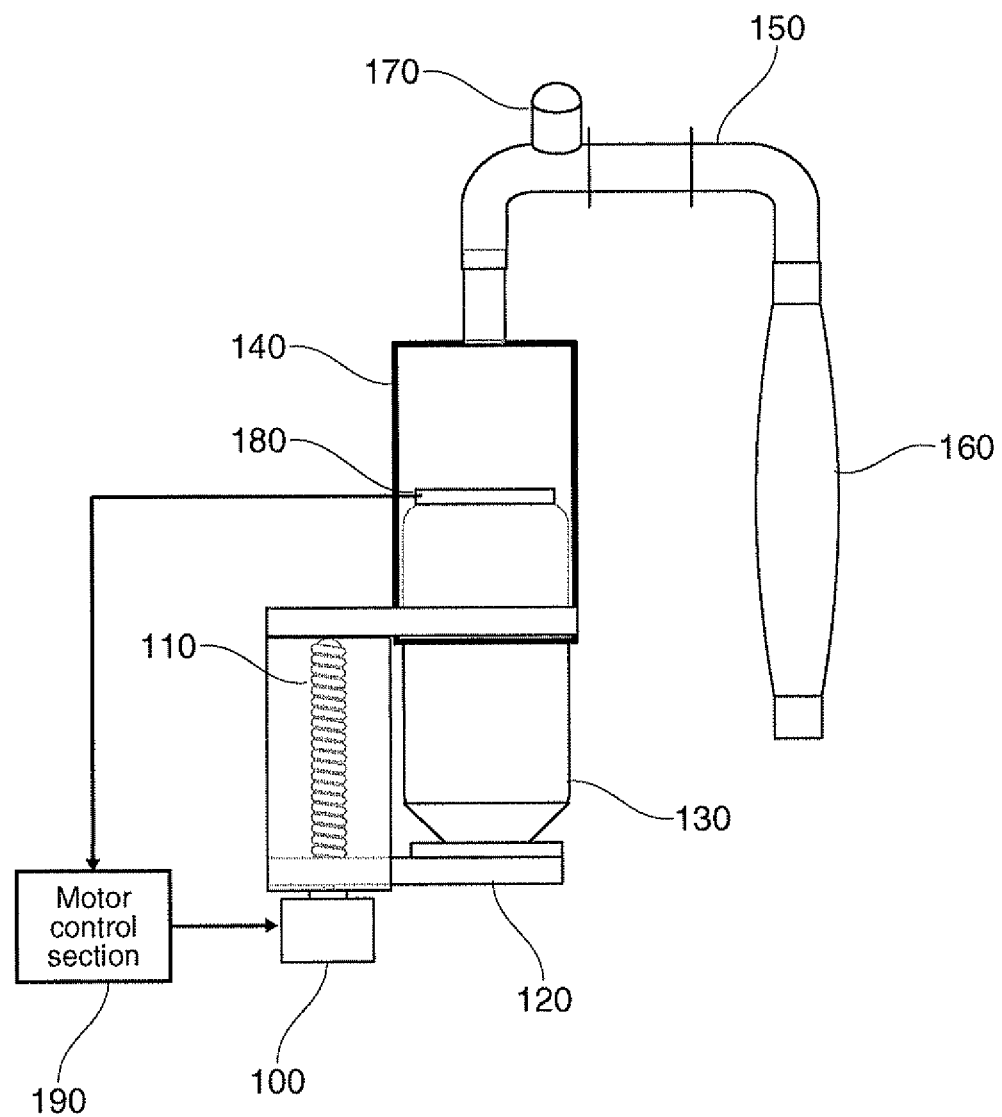
FIG. 4 is a diagram showing the structure of an actuator equipped with a motor control section.

An actuator with a relatively simple structure is described above, but the actuator in accordance with Embodiment 1 may also be equipped with a pressure sensor and a motor control section. FIG. 4 shows the structure of an actuator equipped with a pressure sensor 180 and a motor control section 190.

The pressure sensor 180 may be disposed within, for example, a cylinder 140, and connected to a piston 130. The pressure sensor 180 is configured to measure the pressure applied to the air within the cylinder 140.

The motor control section 190 receives a signal representative of the pressure measured by the pressure sensor 180 as an input signal, and controls revolutions to be generated by the motor 100 based on the signal. For example, the motor control section 190 has a table indicative of the relation between pressures applied to the air and displacements in the moveable port 160, and controls the revolution of the motor 100 so as to keep the displacement in the moveable part 160 to be at a desired value, whereby the pressure to be applied to the air can be adjusted.

(4) Characteristics of Embodiment 1

As described above, the actuator in accordance with Embodiment 1 is equipped with the moveable part 160 that moves according to changes in the amount of air taken, the cylinder 140 that contains air and is configured to be able to supply air to the moveable part 160 according to the pressure applied to the air, and the piston 130 configured to apply pressure to the air within the cylinder 140. Furthermore, the actuator is equipped with the motor 100 that generates revolution, the screw 110 and the slide nut 120 that converts the revolution to force that moves the piston 130. It is noted that the air is enclosed in the moveable part 160, the cylinder 140 and the fluid pipe 150.

According to the actuator having the structure described above, a small-sized actuator, which does not require large-sized components, such as, a compressor and a tank, can be provided. Also, the actuator can be operated only with flow movement of the air, and does not require heating of a part of the actuator. Therefore an actuator with excellent energy efficiency can be provided. Furthermore, as the moveable part is moved by moving the air therein, an actuator that is capable of natural body motion similar to human motion can be provided.

Further, the actuator in accordance with Embodiment 1 is further equipped with the safety device 170. When a force caused by some external factor is applied to the moveable part 160, causing pressure to be applied to the air therein, the safety device 170 is capable of absorbing the pressure by taking the air therein.

According to the actuator having the structure described above, when force caused by some external factor is applied to the moveable part 160, generating pressure to be applied to the air therein, the safety device 170 absorbs the pressure, such that destruction of the actuator including the moveable part 160 can be prevented.

The safety device 170 is provided between the moveable part 160 and the cylinder 140, and is configured to be expandable.

Also, the actuator in accordance with Embodiment 1 is equipped with the pressure sensor 180 that is provided within the cylinder 140 for measuring pressure applied to the air therein, and the motor control section 190 that controls the rotational force to be generated by the motor 100 based on the pressure measured by the pressure sensor 180.

According to the actuator having the structure described above, the pressure to be applied to the air can be dynamically controlled, and therefore an actuator capable of more precise operations can be provided.

It is noted that, according to Embodiment 1, air is exemplified as the substance to be enclosed in the cylinder 140, the fluid pipe 150 and the moveable part 160. However, the embodiment is not limited to air. In other words, instead of air, any gas or liquid can be used. The use of air is advantageous as air is low cost substance, and natural human motion would readily be realized by the actuator using air. The use of liquid in the actuator is advantageous because the actuator using liquid can be used, for example, under water where the ambient pressure is high. Also, by using gas with a small specific gravity, the actuator can be made lighter.

Also, Embodiment 1 uses the motor 100, the screw 110 and the slide nut 120 as a power source for moving the piston 130. However, the embodiment is not limited to the aforementioned structure. For example, a motor and gears may be used, and any method that can be conceived by those skilled in the art can be used instead.

Further, in Embodiment 1, an example in which the pressure sensor 180 is disposed within the cylinder 140 is shown. However, the pressure sensor 180 may be disposed in any area of the actuator where the air is enclosed.

2. Embodiment 2

(1) Structure of Actuator Equipped with Multiple Moveable Parts

Next, an actuator equipped with multiple moveable parts will be briefly described. It is noted that description of components of the actuator in accordance with Embodiment 2 similar to those of the actuator in accordance with Embodiment 1 may be omitted.

Figure 5:
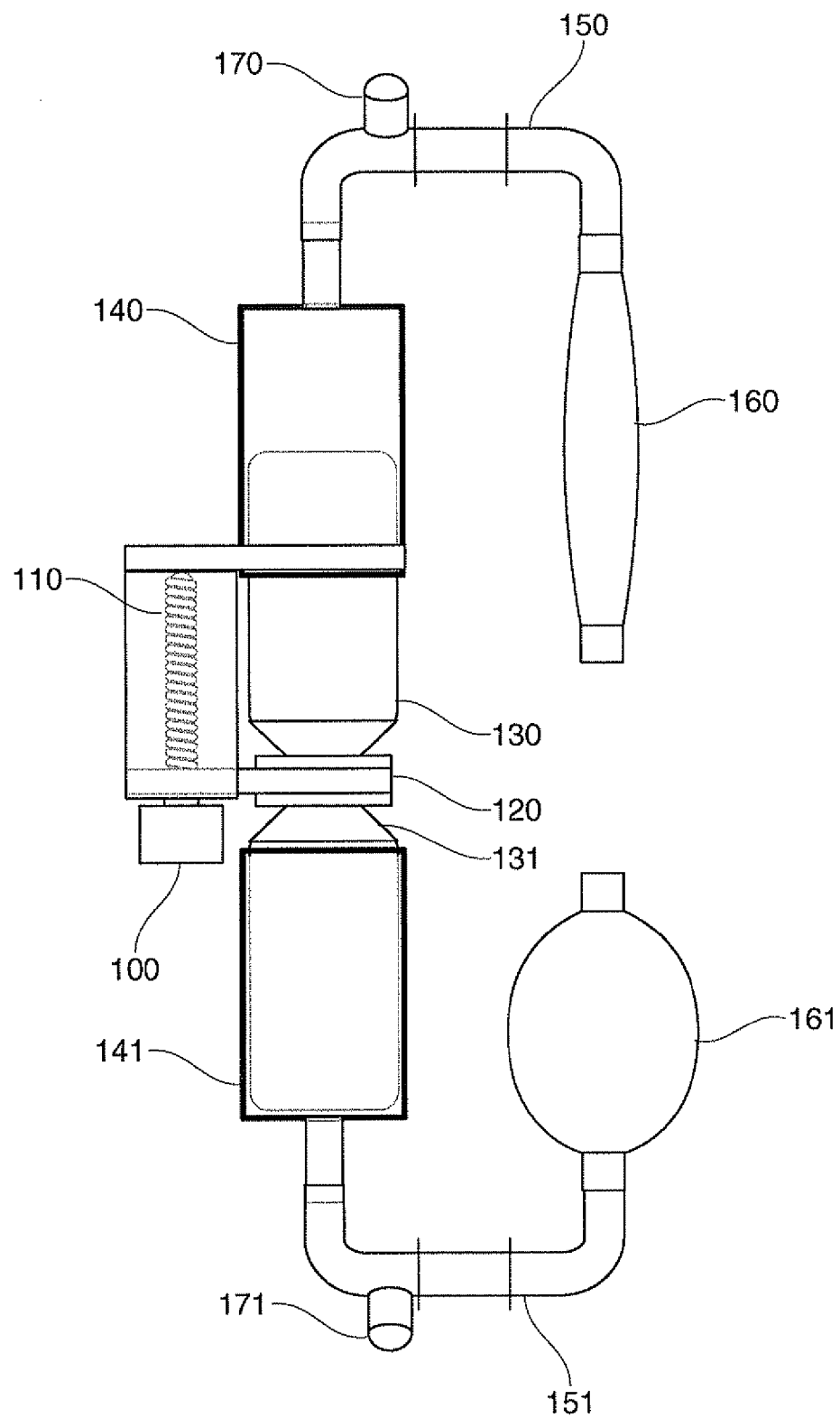
FIG. 5 is a first diagram showing the structure of an actuator having a plurality of moveable parts.
Figure 6:
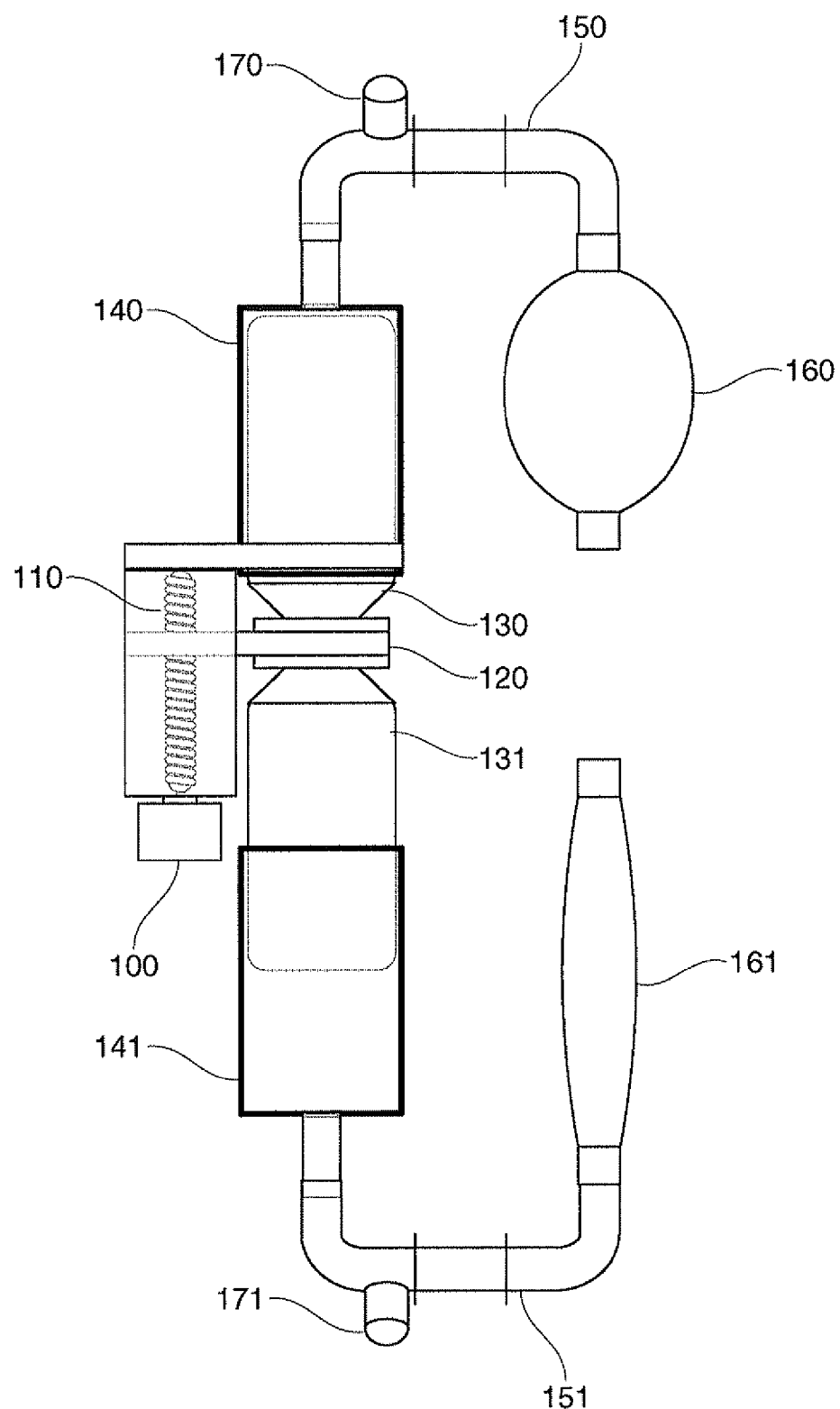
FIG. 6 is a second diagram showing the structure of the actuator having the plurality of moveable parts.

FIG. 5 is a diagram showing the structure of an actuator equipped with two moveable parts. As shown in FIG. 5, the actuator includes a moveable part 160 and a moveable part 161. It is clear from comparison between FIG. 5 and FIG. 1, the actuator in accordance with Embodiment 2 has a configuration in which a piston 131, a cylinder 141, a fluid pipe 151, a moveable part 161 and a safety device 171 are added to the actuator in accordance with Embodiment 1. The piston 131, the cylinder 141, the fluid pipe 151, the moveable part 161 and the safety device 171 have structures and functions similar to those of the piston 130, the cylinder 140, the fluid pipe 150, the moveable part 160 and the safety device 170, respectively. A motor 100, a screw 110 and a slide nut 120 are shared by these two sets of structures.

(2) Operation of Actuator Equipped with Multiple Moveable Parts

Next, an operation of the actuator in accordance with Embodiment 2 will be briefly described.

The motor 100 generates predetermined rotational force to rotate the screw 110. The screw 110 rotates by the rotational force applied by the motor 100, converts the rotation to force in a linear direction, and transmits the same to the slide nut 120. The slide nut 120 simultaneously displaces the pistons 130 and 131 in mutually opposite directions. By this operation, when the air pressure within the cylinder 140 rises, the air pressure within the cylinder 141 lowers. On the other hand, when the air pressure within the cylinder 140 lowers, the air pressure within the cylinder 141 rises. Expansion and contraction occur reciprocally between the moveable parts 160 and 161, in other words, when one of them displaces in an expanding direction, the other displaces in a contracting direction.

(3) Characteristics of Embodiment 2

As described above, the actuator in accordance with Embodiment 2 is further equipped with the moveable part 161, the cylinder 141 and the piston 131 in addition to the structure of the actuator in accordance with Embodiment 1. The piston 131 is configured to apply pressure to air inside the cylinder 141, and air is enclosed in the moveable part 161 and the cylinder 141. It is noted that the air enclosed in the moveable part 161 and the cylinder 141 is independent of the air enclosed in the moveable part 160 and the cylinder 140.

According to the actuator in accordance with Embodiment 2, it is possible to provide an actuator that moves multiple moveable parts at the same time. The actuator that is capable of moving multiple moveable parts at the same time in a relation in which one extends and the other contracts is effective, when movements similar to those of muscles of the human arm are to be created. In other words, the muscles of the human arm move in a manner that, when one group of muscles on one side thereof extend, the other group of muscles on the other side contract. Therefore, the actuator described above is capable of movements similar to movements of the muscles of the human arm.

In Embodiment 2, an example in which the piston is used in each of the cylinders is described. However, these pistons can be defined as one piston. In other words, it can be said that the piston is composed of a portion 130 of the piston and another portion 131 of the piston, and the part 130 of the piston and the other part 131 of the piston apply pressure to the air enclosed in the cylinder 140 and the cylinder 141, respectively.

It is noted that, in Embodiment 2, the actuator equipped with two moveable parts is described as an example. However, the embodiment is also applicable to an actuator equipped with three or more moveable parts.

Also, the two moveable parts do not necessarily require displacement in opposite directions, but may displace, for example, in the same directions. Also, the sizes of the sets of the piston and the cylinder may be made different from each other so that a difference is provided in displacement between one moveable part and the other moveable part. For example, it is possible to design the actuator in such a manner that when the moveable part 160 displaces by 1 cm, the moveable part 161 displaces by 2 cm. In this case, two moveable parts having a certain relation in their displacement amount can be operated by a single motor 100.

3. Applicability of the Invention

The embodiments described above are merely some examples of embodiments of the invention, and the invention includes any changes in the range conceivable by those of ordinary skill in the art based on the embodiments.

For example, an actuator equipped with multiple moveable parts and cylinders, and having a structure in which a pressure sensor is provided in each of the cylinders is conceivable. On the other hand, an actuator may be equipped with multiple moveable parts and cylinders, but may be provided with a pressure sensor in only one of the cylinders. In this case, pressures of air contained in the multiple cylinders may normally have a correlation, and therefore one set of a pressure sensor and a motor control section can control the air pressures. This makes it unnecessary to provide a plurality of pressure sensors in the actuator, which leads to a cost reduction.

Moreover, the actuators described above in the embodiments are applicable to equipment, such as, robots, FA equipment, rehabilitation equipment and the like, and the invention also includes the aforementioned equipment.

What is claimed is:

1. An actuator comprising:
a first moveable part that moves according to changes in an intake amount of first fluid;
a first cylinder that holds the first fluid therein and is configured to supply the first fluid to the first moveable part by way of an opening in the first cylinder;
a fluid pipe that provides a flow path for the first fluid from the first cylinder to the first movable part;
a piston that applies to the first fluid a first pressure that is sufficient to move the first moveable part;
a motor that generates rotational force;
a power converter that converts the rotational force to a force that moves the piston; and
a safety device that projects outside the fluid pipe and that is configured to be in fluid communication with the fluid pipe so as to take in a portion of the first fluid when a second pressure greater than the first pressure is applied to the first fluid by a force applied to the first moveable part,
wherein the opening in the first cylinder is the only mechanism by which fluid enters or exits the first cylinder,
wherein the safety device does not take in the portion of the first fluid under the first pressure applied by the piston, and
wherein the safety device is configured so that its outermost surface expands as it takes in the portion of the first fluid.

2. The actuator according to claim 1, wherein the safety device is configured to expand itself.

3. The actuator according to claim 1, further comprising a pressure sensor that measures pressure applied to the first fluid, and a motor control section that controls the rotational force generated by the motor based on the pressure measured by the pressure sensor.

4. The actuator according to claim 1, comprising:
a second moveable part that moves according to changes in an intake amount of second fluid, and
a second cylinder that holds the second fluid therein, and is configured to supply the second fluid to the second movable part, wherein
the piston is configured to apply pressure also to the second fluid.

5. An actuator comprising:
a first moveable part that moves according to changes in an intake amount of first fluid;
a second moveable part that moves according to changes in an intake amount of second fluid;
a first cylinder that holds the first fluid therein and is configured to supply the first fluid to the first moveable part;
a second cylinder (i) that is constituted by a cylinder housing separate and distinct from a cylinder housing of the first cylinder, (ii) that holds the second fluid therein, and (iii) that is configured to supply the second fluid to the second movable part;
a piston configured to (i) apply to the first fluid a first pressure that is sufficient to move the first moveable part and (ii) apply to the second fluid a second pressure that is sufficient to move the second moveable part;
a motor that generates rotational force;
a power converter that converts the rotational force to a force that moves the piston;
a first safety device that projects outside a first fluid pipe, which provides a flow path for the first fluid from the first cylinder to the first movable part, and that is configured to be in fluid communication with the first fluid pipe so as to take in a portion of the first fluid when a third pressure greater than the first pressure is applied to the first fluid by a force applied to the first moveable part; and
a second safety device that projects outside a second fluid pipe, which provides a flow path for the second fluid from the second cylinder to the second movable part, and that is configured to be in fluid communication with the second fluid pipe so as to take a portion of the second fluid when a fourth pressure greater than the second pressure is applied to the second fluid by a force applied to the second moveable part, wherein the first and the second safety devices do not take in the portions of the first fluid and the second fluid under the first and the second pressures applied by the piston, respectively, and wherein each of the first and the second safety devices is configured so that its outermost surface expands as it takes in the portion of the first fluid or the portion of the second fluid, respectively.

6. The actuator according to claim 5, wherein when the piston increases the pressure applied to one of the first and second fluids, the piston decreases the pressure applied to the other of the first and second fluids.

7. An actuator comprising:

a first moveable part that moves according to changes in an intake amount of first fluid;

a first cylinder that holds the first fluid therein and is configured to supply the first fluid to the first moveable part;

a fluid pipe that provides a flow path for the first fluid from the first cylinder to the first movable part;

a safety device that projects outside the fluid pipe and that is configured to be in fluid communication with the fluid pipe so as to take in a portion of the first fluid when a second pressure greater than a first pressure sufficient to move the first moveable part is applied to the first fluid by a force applied to the first moveable part;

a piston that applies the first pressure to the first fluid;

a motor that generates rotational force; and a power converter that converts the rotational force to a force that moves the piston, wherein the first moveable part, the first cylinder, the safety device, and the fluid pipe constitute a closed system such that fluid does not enter or exit the closed system, wherein the safety device does not take in the portion of the first fluid under the first pressure applied by the piston, and wherein the safety device is configured so that its outermost surface expands as it takes in the portion of the first fluid.

* * * * *